(12) United States Patent
Balmin et al.

(10) Patent No.: US 7,028,028 B1
(45) Date of Patent: Apr. 11, 2006

(54) SYSTEM FOR QUERYING MARKUP LANGUAGE DATA STORED IN A RELATIONAL DATABASE ACCORDING TO MARKUP LANGUAGE SCHEMA

(75) Inventors: Andrey Balmin, San Diego, CA (US); Ioannis Papakonstantinou, La Jolla, CA (US); Kostantinos Stathatos, San Diego, CA (US); Vasilis Vassalos, La Jolla, CA (US)

(73) Assignee: Enosys Markets,Inc., San Diego, CA (US)

( * ) Notice: Subject to any disclaimer, the term of this patent is extended or adjusted under 35 U.S.C. 154(b) by 828 days.

(21) Appl. No.: 09/859,256

(22) Filed: May 17, 2001

(51) Int. Cl.
*G06F 17/30* (2006.01)

(52) U.S. Cl. .......................................... 707/4; 715/511

(58) Field of Classification Search ................ 707/1–4, 707/104.1; 709/203
See application file for complete search history.

(56) References Cited

U.S. PATENT DOCUMENTS

| | | | |
|---|---|---|---|
| 5,970,490 A | 10/1999 | Morgenstern | 707/10 |
| 6,009,436 A | 12/1999 | Motoyama et al. | 707/102 |
| 6,105,043 A * | 8/2000 | Francisco et al. | 715/513 |
| 6,154,738 A * | 11/2000 | Call | 707/4 |
| 6,202,072 B1 | 3/2001 | Kuwahara | |
| 6,418,448 B1 * | 7/2002 | Sarkar | 707/104.1 |
| 2002/0107889 A1 * | 8/2002 | Stone et al. | |
| 2002/0120685 A1 * | 8/2002 | Srivastava et al. | |

FOREIGN PATENT DOCUMENTS

WO    WO 00/45304    8/2000

OTHER PUBLICATIONS

Article entitled "B-Bop Xfinity Suite", by B-Bop Associates, Inc., 1 page, exact date unknown (copyright indicates years 2000, 2001), published at http://www.b-bop.com/products.htm.
Article entitled "XML Database Products", author Ronald Bourret, dated Nov. 29, 2000, 42 pages, published at http://www.rpbourret.com/xml/XMLDatabaseProds.htm.
Article entitled "Efficiently Publishing Relational Data as XML Documents" author Jayavel Shanmugasundaram et al., proceedings of the 26th International Conference on Very Large Databases, Cairo, Egypt, 2000, pp. 65-76.
Article entitled "SilkRoute: Trading between Relations and EML" by Mary Fernandez et al., exact date unknown (printed Mar. 21, 2001), pp. 1-28, published at http://www9.org/w9cdrom/202/202.html.

(Continued)

*Primary Examiner*—Mohammad Ali
*Assistant Examiner*—Sathyanarayan Pannala
(74) *Attorney, Agent, or Firm*—Michael A. Glenn; Glenn Patent Group

(57) ABSTRACT

A data processing system receives data in a first format utilizing a markup language such as eXtensible Markup Language (XML), and stores the data in a different, relational database format involving multiple tables and columns, etc. The system translates subsequent query input expressed in the first format to prepare representative query instructions in SQL or another query language compatible with relational data, and thereafter executes the prepared instructions upon data in the relational database. The system outputs results of the query in format dictated by the query input.

16 Claims, 3 Drawing Sheets

OTHER PUBLICATIONS

Article entitled "XML-SQL Utility (XSU)" by Oracle Corp, exact date unknown (copyright 1996-2000, printed Mar. 21, 2001), pp. 1-51, published at http://technet.oracle.com/docs/tech/xml/oracle_xsu/doc_library/adx04xsu.html.

Article entitled "Mapping DTDs to Databases" by Ronald Bourret, 97 pages, exact date unknown (printed on Apr. 26, 2001), published at http://www.rpbourret.com/xlm/DTDToDatabase/sld001.htm.

Article entitled "XML-DBMS, Version 1.01" by Ronald Bourret, 25 pages, (printed on Apr. 26, 2001), published at http://www.rpbourret.com/xlmdbms/readme.htm.

* cited by examiner

SYSTEM FOR QUERYING MARKUP LANGUAGE DATA STORED IN A RELATIONAL DATABASE ACCORDING TO MARKUP LANGUAGE SCHEMA

BACKGROUND OF THE INVENTION

1. Field of the Invention

The present invention relates to a system and method for data processing, including database and file management. More particularly, the invention receives data structured in a markup language such as XML, and stores the data in a different, relational database format. The invention, however, responds to subsequent query input expressed in the markup language format to query the underlying relational database data and also utilizes the markup language format in outputting query results.

2. Description of the Related Art

Rapid improvements in computing technology help people to create, exchange, and process information with increasing speed and efficiency. This, however, leads to even greater volumes of data to further exchange and process. Still, computers provide the most effective tool for organizing this data and searching for items of interest.

With the advent of the Internet, and attendant need to express data in browser-compatible format, many applications format their data according to one of various markup languages. One of the most powerful markup languages is the extensible Markup Language (XML). XML is a non-mutually exclusive alternative to presentation-dependent markup languages such as HyperText Markup Language (HTML). Basically, XML is a language for creating markup languages that describe data. In contrast to HTML which describes document structure and visual presentation, XML describes data in a human readable format with no indication of how the data is to be displayed. XML is also popular due to its flexibility, and easy adaption to changing requirements. XML is said to employ a database-neutral, device-neutral format.

In any case, all data is generated with the expectation and purpose of storage for some later use. With XML data, however, there are numerous obstacles to efficiently accessing and recalling voluminous data, despite the other advantages that XML offers toward ease of exchange and presentation. One option is to store XML data in various "files". This presents difficulties, such as the burden of universally applying changes to data across the files, and correlating related data. From the standpoint of data reliability and ease of use, "file" storage of XML data is therefore less than satisfactory. Initially, storage of XML data in a relational database or an object-relational database would appear to make sense. In other contexts, database queries are known to save countless hours of human endeavor by rapidly searching enormous machine-readable databases for user-specified data. Databases (and especially relational or object-relational databases) ensure consistent implementation of changes, provide universally identical access to different users, and organize data for particularly efficient access.

With XML data, however, relational databases are not a completely satisfactory solution. Broadly, relational databases are inherently inconsistent with XML data. Relational databases organize data into tables, rows, and columns, whereas XML organizes data into elements and sub-elements, the nature of which is inherently variable and not subject to placement in tables.

Some approaches have addressed the problem of transforming XML data into relational databases. One example is the XML-SQL utility (XSU), commercially available from the ORACLE CORPORATION. Even when XML data is transformed into relational database data, however, new problems crop up. Chiefly, it is difficult to address queries to the relational database contents, since the data have been originally supplied as XML data. In particular, the user must manually construct structured query language (SQL) queries aimed at the relational database data. To do this, however, the user must know various details about how the data is stored in the database, and must change his/her thinking from the XML data (as originally supplied) to the relational database data (in its current form). In many cases, this is inconvenient or difficult, as the data (as stored) does not correspond to the user's vision of the data, since the user is still partially thinking in terms of the XML data's completely different organization. This thinking is often perpetuated because of the user's desire to treat data retrieved from the relational database as XML data once again.

Consequently, such relational database queries can be complex and error prone. This increases the cost of accessing the data, both in terms of (1) manpower, since a more sophisticated user is required to construct difficult database queries and (2) errors, since mistakes in constructing the difficult queries yield incorrect query outputs.

Consequently, known approaches to storing XML data in a relational database systems are not completely adequate due to various unsolved problems.

SUMMARY OF THE INVENTION

Broadly, the present invention concerns a data processing system that receives data in a markup language such as XML, and stores the data in a different, relational database (or object-relational database) format. The system then translates between subsequent query input expressed in the markup language format to apply corresponding query instructions to the underlying relational database data, and thereafter output markup language style results appropriate to the query input.

More particularly, this system includes a translator, with loader, map, and wrapper subcomponents. The loader and wrapper interface with a relational database management system including a data server and data store. Initially, the loader receives input including a statement of a markup language data schema and data described by the markup language data schema. The loader then prepares a translation of the markup language data schema into a relational database schema that comprises multiple tables where each table comprises multiple columns. In anticipation of future use, the loader stores the translation in the map. The loader utilizes the translation to translate the received data into translated data comprising an instance of the relational database schema. The loader also issues instructions to the data server to store the translated data.

Initially, the wrapper receives query input including 1) query conditions referring to data according to the markup language data schema, and 2) markup language result-assembly instructions. The received query input resides in a query language that is structured to operate upon markup language data and contemplates query concepts comprising two or more of the following: JOIN, GROUPING, SELECTION, PROJECTION, ORDERING, and NAVIGATION, with JOIN and/or GROUPING at minimum. The wrapper prepares query instructions implementing at least a portion of the query input, the query instructions including structured query language (SQL) query conditions referring to said relational database schema and SQL result-assembly instructions. The wrapper also instructs the data server to execute the query instructions, and thereafter receives query results organized according to the SQL result-assembly instructions. Ultimately, the wrapper utilizes the map to provide an output of the query results according to the markup language result-assembly instructions.

The foregoing features may be implemented in a number of different forms. For example, the invention may be implemented to provide a method of processing and querying data. In another embodiment, the invention may be implemented to provide an apparatus such as a data management system. In still another embodiment, the invention may be implemented to provide a signal-bearing medium tangibly embodying a program of machine-readable instructions executable by a digital data processing apparatus to perform data storage and query operations as discussed herein. Another embodiment concerns logic circuitry having multiple interconnected electrically conductive elements configured to store and query data as described herein.

The invention affords its users with a number of distinct advantages. Chiefly, the invention supports the widespread popularity of XML data by permitting users to provide such data for storage in a relational database and to construct future data queries according to the XML format of the data. Invisible to the user, the data is actually stored in a relational database format, separate from its original XML format. Consequently, the invention stores data with the accuracy, reliability, efficiency, and powerful accessibility afforded by relational databases without requiring users to abandon their XML mentality. The invention is convenient to use because users' queries can observe the same model as was originally used to organize the data under XML. From the standpoint of convenience, the invention is also advantageous because it can be utilized with non-proprietary or even commercially available relational database management systems that conform or partially conform to the SQL standard. Furthermore, by facilitating queries that are more simple, clear, and direct, the invention also permits less skilled people to store and query data, reducing the database's operating costs and susceptibility to error. As another advantage, system administrators can update the invention's translator to universally tune the system for better optimization of queries. Such optimizations are applied universally to incoming queries, rather than requiring individual query constructors to optimize their own queries.

The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections

Introduction

Figure 1:
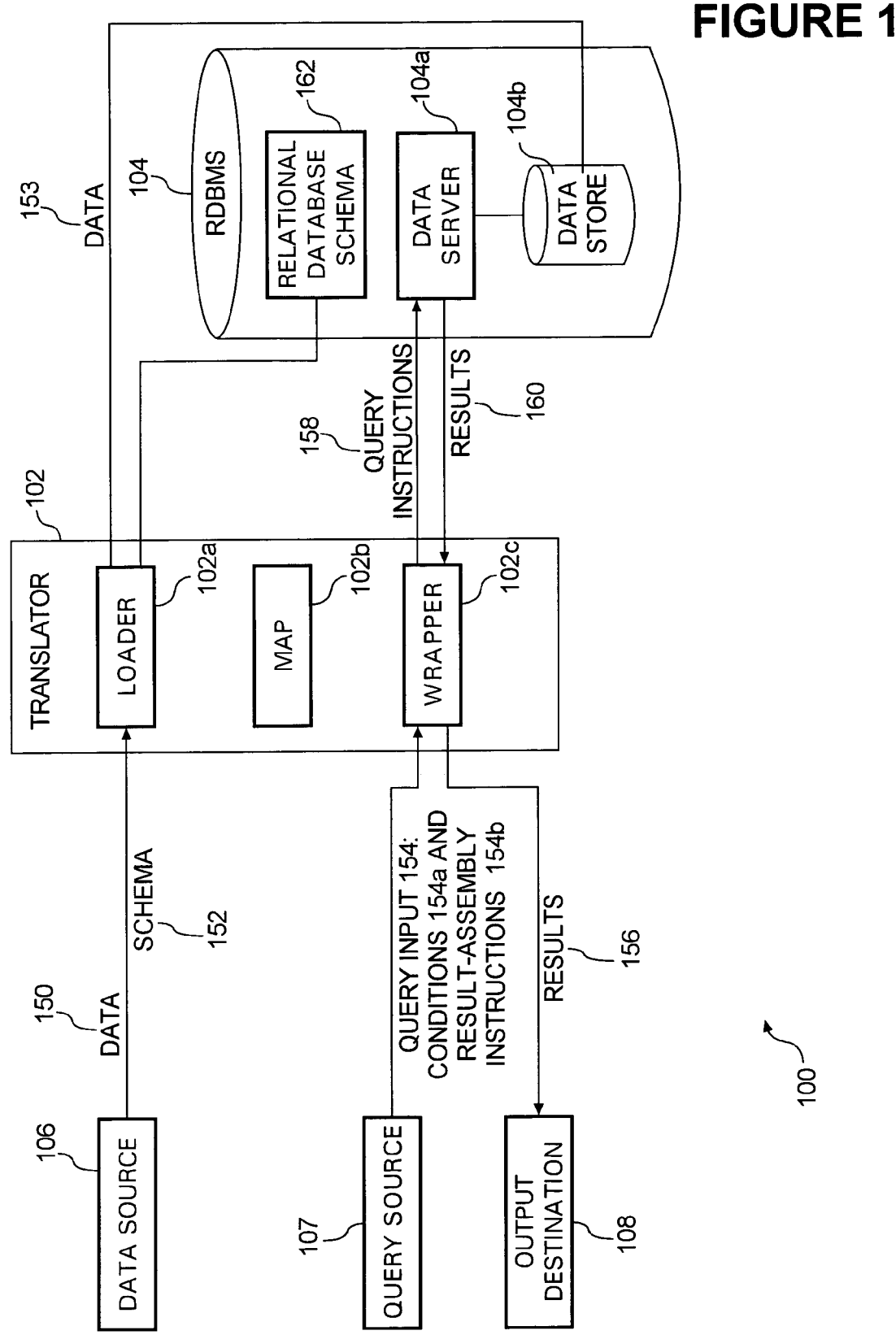
FIG. 1 is a block diagram of the hardware components and interconnections of a data management system according to the invention.

One aspect of the invention concerns a data management system, configured to receive data and queries underr a markup language data schema, but to store and query the data according to a relational database schema. Although this system may be embodied by various hardware components and interconnections, the system 100 of FIG. 1 provides one illustrative example.

The system 100 is comprised of a translator 102 and relational database management system (RDBMS) 104. As shown below, the translator interacts with one or more data sources 106, query sources 107, and output destinations 108.

Relational Database Management System

The RDBMS 104 includes hardware and software components to store, retrieve, and query data of one or more relational databases. To this end, the RDBMS 104 may be implemented by a data server 104a and data store 104b, as shown. The RDBMS 104 may be implemented by one or more personal computers, computer servers, computer workstations, mainframe computers, digital data storage devices, network attached storage devices, storage area networks, or any other appropriate system. The RDBMS 104 may comprise a non-proprietary or even commercially available product.

Data resides in the data store 104b, which comprises one or more digital data storage devices such as magnetic disk drive, circuit storage, magnetic tape, optical storage, or any other storage. The data server 104a comprises an execution engine that manages storage, retrieval, and querying of data, and may for example comprise a software module running in a storage controller, device controller, server machine, or other construct.

Source/Destination for Data

The system 100 also includes various sources of information and destinations for information. More particularly, the data source 106 provides input data 150 to the translator 102 for storage in the RDBMS 104. The data source 106 also provides a schema 152 describing the data 150. The query source 107 provides query input 154 to the translator 102. The query input 154 includes various query conditions 154a and result-assembly instructions 154b. Each of the data source 106 and query source 107 may comprise one or more sources of automated or manually generated information, such as terminals, human interface devices, computers, scanners, computer networks, telephonic devices, or other source of input data and schema.

The output destination 108 represents the place where the translator 102 sends query results 156 prepared according to the query input 154. The destination 108 may comprise a computer, computer network, video display monitor, computer printer, teletype machine, communications link, or any other means for storing, presenting, relaying, or otherwise receiving the query results 156.

Translator

Generally, the translator 102 receives data in a first "markup language" format, and stores the data in a different, "relational database" format. The markup language format includes, without limitation, XML, SGML, HTML, WML, and the like, whereas the relational database format involves multiple tables and multiple columns, etc. The translator 102 also translates query input 154 expressed in the markup language format to prepare representative query instructions in SQL or another query language compatible with relational database data, directs execution of the prepared instructions upon data in the relational database, and outputs results of the query in the markup language format dictated by the query input. To suit the foregoing purposes, the translator 102 may comprise a personal computer, computer workstation, computing network, mainframe computer, software module running on another machine (such as the data server 104a, if suitably powerful), etc. Ordinarily skilled artisans having the benefit of this disclosure will also recognize a variety of other implementations of the translator 102, still contemplated by the present invention.

The translator 102 includes a loader 102a, map 102b, and wrapper 102c. The loader 102a receives input including a statement of a markup language data schema 152 and data 150 described by the markup language data schema. The loader 102a generates an appropriate relational database schema 162, and creates a map 102b that provides a translation between this schema 162 and the markup data schema 152. The schema 162, which specifies multiple tables each with multiple columns, may reside in the RDBMS 104 (as illustrated), or another location such as the loader 102a or another location within or accessible to the translator 102. The map 102b may be stored in the translator 102 (as illustrated), or another location accessible to the translator 102, such as the RDBMS 104. The loader 102a utilizes the map 102b to translate the received data 150 into translated data 153 constituting an instance of the relational database schema 162. The loader 102a also issues instructions to the data server 104a to store the translated data 153.

In one embodiment, the map 102b may be represented as a sequence of connected nodes i.e., a tree of nodes. Each node maintains information on one element in the data schema 152 and its mapping to a column attribute in the relational database schema 162. As one particular example, each map node may contain the information shown in TABLE 1, below.

TABLE 1 name (Element name -- as defined in data schema)
type (Element type -- as defined in data schema (e.g., Integer, float, string, etc).)
optional (Flag indicating whether this element is optional or not in the data schema.
repeatable (Flag indicating whether this element is repeatable or not, i.e., whether there can be multiple copies of it).
schema (Name given by Translator to the relational schema that it creates
tblName (Name of a table in the relational DB in which the element is stored.)
colName (Name of a column in relational schema to which this element defined in the data schema maps.)
children (List of "children" of this map node, i.e., other map nodes.)

The wrapper 102c receives query input 154 including 1) query conditions 154a referring to data under the markup language data schema, and 2) markup language result-assembly instructions 154b. The received query input 154 resides in a query language that is structured to operate upon markup language data and contemplates query concepts comprising any two or more of the following actions: JOIN, GROUPING, SELECTION, PROJECTION, ORDERING, and NAVIGATION, with JOIN and/or GROUPING at minimum. One example of a query language meeting these requirements is XQUERY, discussed in greater detail below. The wrapper 102c prepares query instructions 158 implementing some or all of the query input 154. The query instructions 158 include (1) query conditions referring to the relational database schema 162 and (2) result-assembly instructions. The instructions 158 are stated in a relational database query language, such as SQL, QUEL, or QBE (Query By Example), with SQL being used as the dominant example herein. The wrapper 102c instructs the data server 104a to execute the query instructions; the data server 104a provides the wrapper 102c with query results organized according to the query instructions 158. The wrapper 102c ultimately provides an output of the query results 156 to the output destination 108, this output observing the markup language result-assembly instructions 154b.

Advantageously, software of the wrapper 102c may be updated, upgraded, de-bugged, or otherwise supplemented by a system administrator, designer, developer, remote computer, or other updating source in order to universally tune the system for better optimization of queries. Such optimizations are therefore applied universally to incoming queries, rather than requiring individual query constructors to optimize their own queries.

Exemplary Digital Data Processing Apparatus

As mentioned above, the translator 102, RDBMS 104, and other computing features of the invention may be implemented in various forms. As one example, these components may be provided by separate digital data processing apparatuses (or a single, combined unit), exemplified by the hardware components and interconnections of the digital data processing apparatus 200 of FIG. 2.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the computing features of the system 100. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features of the present invention, the operational aspect of the present invention will now be described. As mentioned above, the operational aspect of the invention generally involves (1) receiving data in a markup language format, (2) storing the data in a different, relational database format, (3) translating subsequent query input expressed in the markup language format to prepare representative query instructions in SQL or another relational database query language, (4) executing the prepared instructions upon data in the relational database, and (5) outputting representative results in the markup language format. Although the present invention has broad applicability to various markup languages and query languages, the specifics of the configuration as described is particularly suited for use of XML and SQL, and the explanation that follows will emphasize such an application of the invention without any intended limitation.

Signal-Bearing Media

Figure 2:
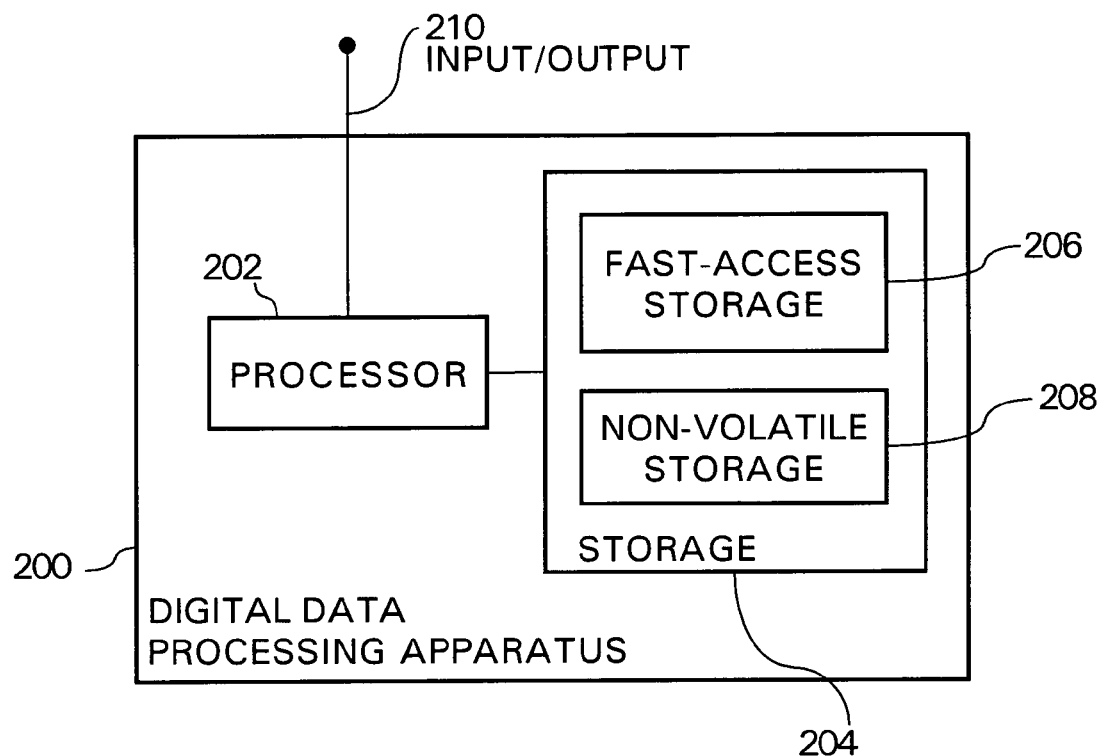
FIG. 2 is a block diagram of a digital data processing machine according to the invention.
Figure 3:
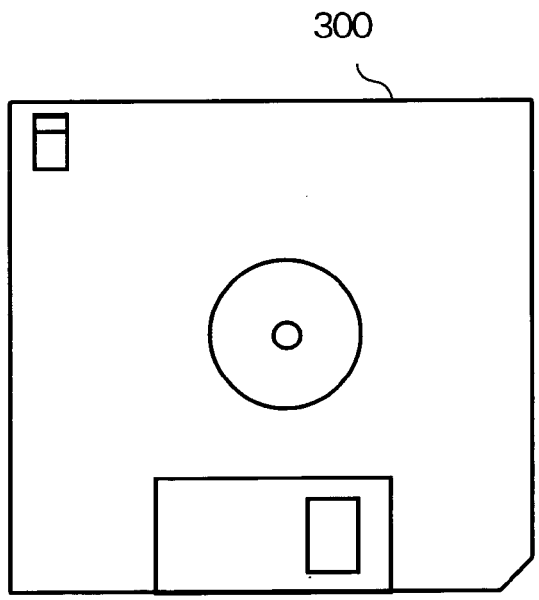
FIG. 3 shows an exemplary signal-bearing medium according to the invention.

In embodiment where the translator 102, RDBMS 104, or other computing features comprise machine-executed program sequences, they may be implemented in various forms of signal-bearing media. In the context of FIG. 2, this signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include as direct access storage (e.g., a conventional "hard drive", redundant array of inexpensive disks ("RAID"), or another direct access storage device ("DASD")), serial-access storage such as magnetic or optical tape, electronic read-only memory (e.g., ROM, EPROM, or EEPROM), optical storage (e.g., CD-ROM, WORM, DVD, digital optical tape), paper "punch" cards, or other suitable signal-bearing media including analog or digital transmission media and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the translator 102, RDBMS 104, and/or any other computing feature of the system 100, and is configured to perform operations to implement the method of the invention. The logic circuitry may be implemented using many different types of circuitry, as discussed above.

Overall Sequence of Operation

Figure 4:
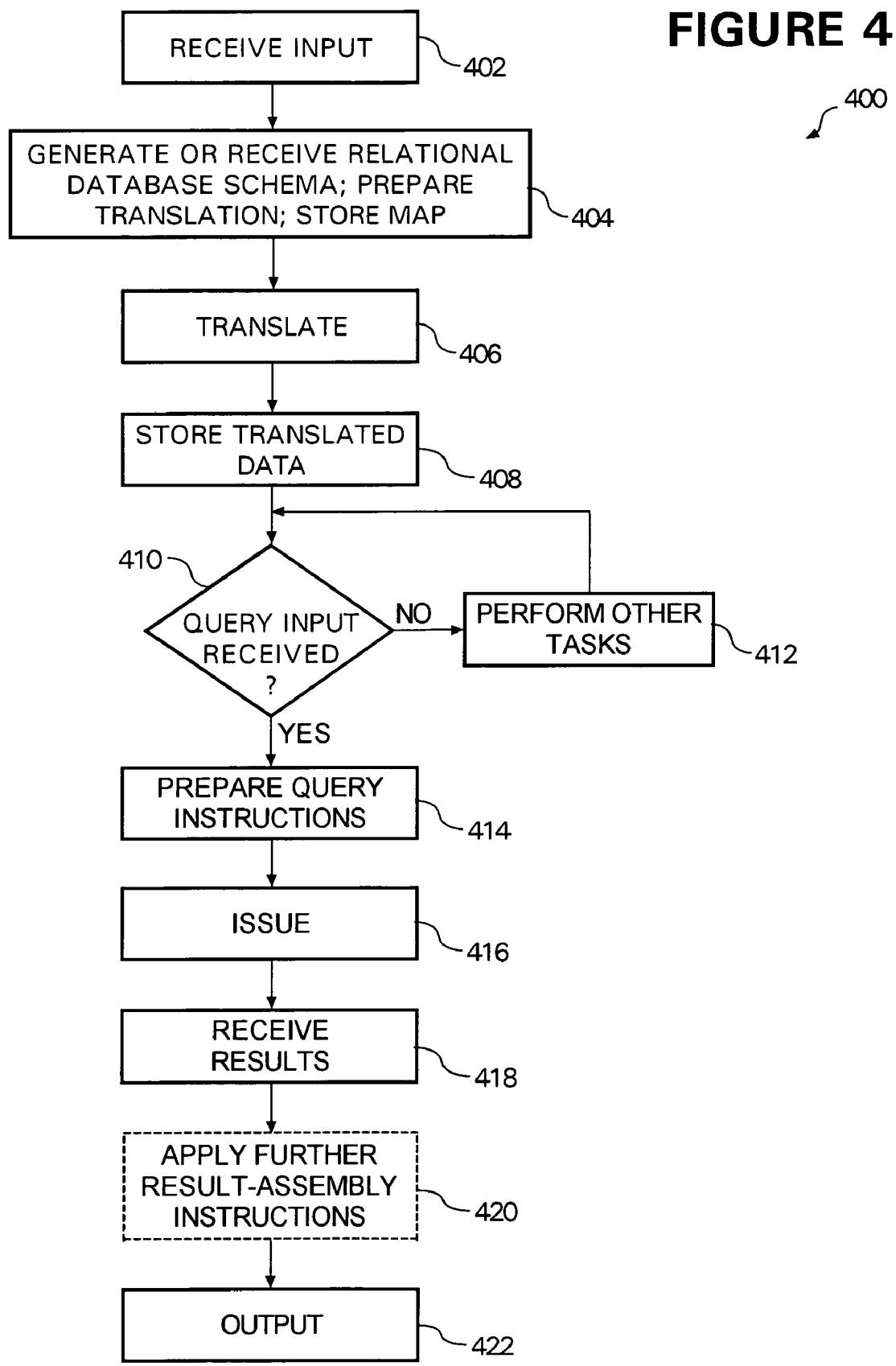
FIG. 4 is a flowchart of an operational sequence for storing and querying data, where data and queries are received under a markup language data schema but queried and stored in a relational database schema, according to the invention.

FIG. 4 shows a sequence 400 to illustrate one example of the method aspect of the present invention. Broadly, this sequence serves to receives data in a markup language such as XML, and stores the data in a different, relational database (or object-relational database) format. The system then translates between subsequent query input expressed in the markup language format to apply representative query instructions to the underlying relational database data, and thereafter output markup language style results appropriate to the query input. For ease of explanation, but without any intended limitation, the example of FIG. 4 is described in the context of the system 100 described above (FIG. 1).

In step 402, the loader 102*a* receives input from the data source 106, this input including (1) data 150 to be stored and possibly queried in the future and (2) a schema 152 describing this data. In one example, where the data source 106 is a computer, step 402 may be implemented by a user operating this computer to transmit, upload, or otherwise transfer the data 150 and schema 152 to the loader 102*a*. The schema 152 comprises a markup language data schema, namely, a schema describing data formatted with tags and other indicia of a markup language. Optionally, the schema 152 itself may be expressed in this same markup language, in a different markup language, by graphical means, etc. Any one of various markup languages may be used, such as XML, HTML, SGML, WML, or other known markup languages or markup languages that arise in the future. The arriving data 150 is formatted according to this markup language and comprises an instance of the schema 152.

In step 404, the loader 102*a* generates or receives a relational database schema 162. Unlike the markup language data schema 152, the relational database schema 162 describes data comprising multiple tables, each with multiple columns, and therefore describes data stored in relational database format. As of step 404, this data is non-existent, although such relational database data will be subsequently written to the store 104*b* as discussed below. In one embodiment, step 404 involves the loader 102*a* analyzing the data 150 and then generating details of the relational database schema 162 (such as the number of tables, columns, etc.). The foregoing operation also has the effect of preparing a translation of the markup language data schema 152 into the relational database schema 162. Alternatively, step 404 may involve receiving the details of the relational database schema 162 from various sources, such as the data source 106, pre-programming of the loader 102*a*, or user input to the loader 102*a*. In this embodiment, a separate step is performed to prepare a translation of the markup language data schema 152 into the relational database schema 162. In any case, the loader 102*a* as part of step 404 stores the translation (prepared as discussed above) in the map 102*b*.

In step 406, the loader 102*a* utilizes the map 102*b* to translate the markup language data 150 into relational database data 153, this data providing an instance of the relational database schema 162. In step 408, the loader 102 transmits the translated data 153 to the data server 104*a*, which stores the newly translated relational database data 153 in the store 104*b*. The data 153, now residing in the RDBMS 104, is available for retrieval by the data server 104*a*, querying by the data server 104*a*, supplementing by the data server 104*a* with new data, and other data management operations.

In step 410 the wrapper 102*c* determines whether it has received any query input 154 from the query source 107. If not, the wrapper 102*c* may wait or perform other tasks (step 412). In contrast, if query input is received, step 410 advances to step 414.

In one example of step 410, where the query source 107 is a computer, the query input 154 is submitted by a user operating this computer to transmit, upload, or otherwise transfer the query input 152 to the wrapper 102*c*. The query input 154 includes query conditions 154*a* referring to data under the markup language data schema 152, and markup language result-assembly instructions 154b. The markup language result-assembly instructions 154b provide instructions on how to construct markup language data of the appropriate structure to return the result. The query input 154 resides in a query language that is structured to operate upon markup language data and contemplates query concepts comprising any two or more of the following: JOIN, GROUPING, SELECTION, PROJECTION, ORDERING, and NAVIGATION, with JOIN and/or GROUPING at minimum. An exemplary query language meeting these requirements is XQUERY, which is a draft recommendation of the World Wide Web Consortium having its specification set forth at http://www.w3.org/TR/xquery/. The entirety of the foregoing specification is incorporated herein by reference. Responsive to the query input 154, step 410 advances to step 414.

In step 414, the wrapper 102c responds to the query input 154 by preparing query instructions 158 implementing some or all of the query conditions 154a and/or some or all of the result-assembly instructions 154b. Namely, the wrapper prepares instructions 158 by consulting the map 102b. The query instructions 158 include query conditions and result-assembly instructions both occurring in a query language compatible with the RDBMS 104 and therefore referring to the relational database schema 162. The query instructions 158 may, for example, be embodied in a query language such as SQL, QUEL, or QBE. In the case of SQL, the result-assembly instructions 158 are implemented by an SQL SELECT clause in the query instructions 158.

More particularly, step 414 involves the wrapper 102c reading the map 102b and the query input 154. The query input 154 is given either in a query language with the characteristics discussed above or in another representation that has the same characteristics, such as one or multiple sequences of operators, an algebraic expression, an execution plan etc. The wrapper 102c breaks the query input down into a sequence of operations (or the query input may be initially stated as a sequence of operations). For each operation in this sequence, the wrapper 102c determines which element(s) of the data schema 154 is referred to, utilizes the map 102b to find the corresponding columns and tables in the relational database schema 162, and translates each operation into the appropriate piece of SQL code. The wrapper then generates SQL result-assembly instructions, completing construction of the SQL query 158. In step 416, the wrapper 102c instructs the data server 104a to execute the query instructions 158.

Optionally, the wrapper 102c may omit some of the query conditions 154a and/or result-assembly instructions in preparing the instructions 158. For instance, some operations such as NAVIGATION cannot be executed by relational databases, and must be processed later as discussed below. In other cases, efficiency may be gained by omitting some conditions (such as ORDERING) for later processing. In still other cases, such as selection conditions on string type data, certain RDBMS do not provide reliably accurate results. Thus, the wrapper 102c may omit certain conditions 154a from the instructions 158. As discussed below, these conditions are implemented later by actions of the wrapper 102c upon the RDBMs query results 160.

In step 418, the wrapper 102c receives the results 160 of the execution of the instructions 158 by the data server 104a. These results are organized according to the result-assembly instructions of 158. In step 420, the wrapper 102c itself applies any remaining query conditions 154a that were omitted from the query instructions 158 and therefore not executed by the RDBMS 104.

Finally, in step 422, the wrapper 102c reformats the query results 160 according to the markup language result-assembly instructions 154b, and provides a representative output to the destination 108. Namely, upon delivery of the relational data results 160 by the data server 104a, the wrapper 102c executes the result-assembly instructions 154b part of the query input 154 to generate a final XML result 156.

The steps 410–422 may be performed repeatedly in order to process new query input. The steps 402–408 may be repeated as needed to redefine the relational database schema, translation, and the like to accommodate different types of input data.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. For example, while reference has been made to relational databases, the invention also contemplates object-relational database technology, with the term "relational database" therefore being utilized as shorthand. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A query processing method, comprising the operations of:
   receiving input including a statement of a markup language data schema and data described by the markup language data schema;
   preparing a translation of the markup language data schema into a relational database schema comprising multiple table definitions each table definition comprising multiple column definitions;
   utilizing the translation to translate the received data into translated data comprising an instance of the relational database schema;
   a wrapper performing operations comprising:
      receiving query input including at least one of the following: 1) query conditions referring to data formatted according to the markup language data schema, and 2) result-assembly instructions for constructing query results according to the markup language;
      wherein the received query input resides in a query language that is structured to operate upon markup language data and contemplates query actions comprising any two or more of Selection, Projection, Join, Grouping, Ordering, and Navigation with at least one of Join and Grouping at minimum;
      preparing query instructions implementing at least a portion of said query input, the query instructions including structured query language (SQL) query conditions referring to said relational database schema;
      issuing one or more commands to execute the query instructions upon the translated data to produce query results;

receiving the query results and providing an output of the query results according to the query input.

2. The method of claim 1, where the markup language data schema utilizes one or more of the following: SGML, HTML, WML.

3. The method of claim 1, further comprising the operations of:
generating the relational database schema.

4. The method of claim 1, the operations further comprising:
responsive to the issuing of commands to execute the query instructions, a data server executing the query instructions upon the translated data and providing an output according to said query instructions.

5. The method of claim 1, wherein:
the operation of preparing query instructions implements only a portion of said query input and leaves a remainder of the query input free from implementation;
the operation of receiving query results further comprises execution of the remainder of the query input.

6. A computer-readable storage medium tangibly embodying a program of machine-readable instructions executable by a digital processing apparatus to perform operations for processing queries, said operations comprising:
receiving input including a statement of a markup language data schema and data described by the markup language data schema;
preparing a translation of the markup language data schema into a relational database schema comprising multiple table definitions each table definition comprising multiple column definitions;
utilizing the translation to translate the received data into translated data comprising an instance of the relational database schema;
a wrapper performing operations comprising:
receiving query input including at least one of the following: 1) query conditions referring to data formatted according to the markup language data schema, and 2) result-assembly instructions for constructing query results according to the markup language;
wherein the received query input resides in a query language that is structured to operate upon markup language data and contemplates query actions comprising any two or more of Selection, Projection, Join, Grouping, Ordering, and Navigation with at least one of Join and Grouping at minimum;
preparing query instructions implementing at least a portion of said query input, the query instructions including structured query language (SQL) query conditions referring to said relational database schema;
issuing one or more commands to execute the query instructions upon the translated data to produce query results;
receiving the query results and providing an output of the query results according to the query input.

7. A logic circuit of multiple interconnected electrically conductive elements configured to perform operations to process queries, the operations comprising:
receiving input including a statement of a markup language data schema and data described by the markup language data schema;
preparing a translation of the markup language data schema into a relational database schema comprising multiple table definitions each table definition comprising multiple column definitions;
utilizing the translation to translate the received data into translated data comprising an instance of the relational database schema;
a wrapper performing operations comprising:
receiving query input including at least one of the following: 1) query conditions referring to data formatted according to the markup language data schema, and 2) result-assembly instructions for constructing query results according to the markup language;
wherein the received query input resides in a query language that is structured to operate upon markup language data and contemplates query actions comprising any two or more of Selection, Projection, Join, Grouping, Ordering, and Navigation with at least one of Join and Grouping at minimum;
preparing query instructions implementing at least a portion of said query input, the query instructions including structured query language (SQL) query conditions referring to said relational database schema;
issuing one or more commands to execute the query instructions upon the translated data to produce query results;
receiving the query results and providing an output of the query results according to the query input.

8. A data storage and querying system, comprising:
a loader programmed to perform operations comprising:
receiving input including a statement of a markup language data schema and data described by the markup language data schema;
preparing a translation of the markup language data schema into a relational database schema comprising multiple table definitions each table definition comprising multiple column definitions;
utilizing the translation to translate the received data into translated data comprising an instance of the relational database schema;
issuing instructions to store the translated data;
a wrapper programmed to perform operations comprising:
receiving query input including at least one of the following: 1) query conditions referring to data under the markup language data schema, and 2) markup language result-assembly instructions;
wherein the received query input resides in a query language that is structured to operate upon markup language data and contemplates query actions comprising any two or more of Selection, Projection, Join, Grouping, Ordering, and Navigation with at least one of Join and Grouping at minimum;
preparing query instructions implementing at least a portion of said query input, the query instructions including structured query language (SQL) query conditions referring to said relational database schema;
issuing one or more commands to execute the query instructions upon the translated data to produce query results;
receiving the query results and providing an output of the query results according to the query input.

9. The system of claim 8, further comprising:
a map storing the translation of the markup language data schema into a relational database schema.

10. The system of claim 8, the wrapper and loader being programmed to be compatible with markup language data schema utilizing one or more of the following:
SGML, HTML, WML.

11. The system of claim 8, the loader being further programmed to perform operations comprising:
generating the relational database schema.

12. The system of claim 8, further comprising a data server programmed to perform operations comprising:
responsive to the issuing of commands to execute the query instructions, executing the query instructions upon the translated data and providing an output according to said query instructions.

13. The system of claim 8, where the wrapper is programmed such that:
the operation of preparing query instructions implements only a portion of said query input and leaves a remainder of the query input free from implementation;
the operation of receiving query results further comprises execution of the remainder of the query input.

14. The system of claim 8, further comprising:
a relational database management system containing the translated data.

15. A data storage and querying system, comprising:
loader means for:
receiving input including a statement of a markup language data schema and data described by the markup language data schema;
preparing a translation of the markup language data schema into a relational database schema comprising multiple table definitions each table definition comprising multiple column definitions;
utilizing the translation to translate the received data into translated data comprising an instance of the relational database schema;
issuing instructions to store the translated data;
wrapper means for:
receiving query input including at least one of the following: 1) query conditions referring to data under the markup language data schema, and 2) markup language result-assembly instructions;
wherein the received query input resides in a query language that is structured to operate upon markup language data and contemplates query actions comprising any two or more of Selection, Projection, Join, Grouping, Ordering, and Navigation with at least one of Join and Grouping at minimum;
preparing query instructions implementing at least a portion of said query conditions, the query instructions including structured query language (SQL) query conditions referring to said relational database schema;
issuing one or more commands to execute the query instructions upon the translated data to produce query results;
receiving the query results and providing an output of the query results according to the query input.

16. A query processing method, comprising the operations of:
receiving multiple different schema/data inputs, each schema/data input including a statement of a markup language data schema and data described by the markup language data schema;
for each schema/data input, performing operations comprising:
preparing a translation of the markup language data schema into a corresponding relational database schema comprising multiple table definitions each table definition comprising multiple column definitions;
utilizing the translation to translate the received data into translated data comprising an instance of the relational database schema;
operations, performed by a wrapper, comprising:
receiving query input including at least one of the following: 1) query conditions referring to data formatted according to the markup language data schema, and 2) result-assembly instructions for constructing query results according to the markup language;
wherein the received query input resides in a query language that is structured to operate upon markup language data and contemplates query actions comprising any two or more of Selection, Projection, Join, Grouping, Ordering, and Navigation with at least one of Join and Grouping at minimum;
preparing query instructions implementing at least a portion of said query input, the query instructions including structured query language (SQL) query conditions referring to said relational database schema;
responsive to issuance of one or more commands to execute the query instructions upon the translated data and produce query results, receiving the query results and providing an output of the query results according to the query input.

* * * * *

UNITED STATES PATENT AND TRADEMARK OFFICE
CERTIFICATE OF CORRECTION

PATENT NO.         : 7,028,028 B1
APPLICATION NO. : 09/859256
DATED               : April 11, 2006
INVENTOR(S)       : Andrey Balmin et al.

It is certified that error appears in the above-identified patent and that said Letters Patent is hereby corrected as shown below:

Title Page, [73] Assignee: Replace "Enosys Markets, Inc., San Diego, CA"

with --BEA Systems, Inc., San Jose, CA--

Signed and Sealed this

Nineteenth Day of December, 2006

JON W. DUDAS
*Director of the United States Patent and Trademark Office*